UNITED STATES PATENT OFFICE.

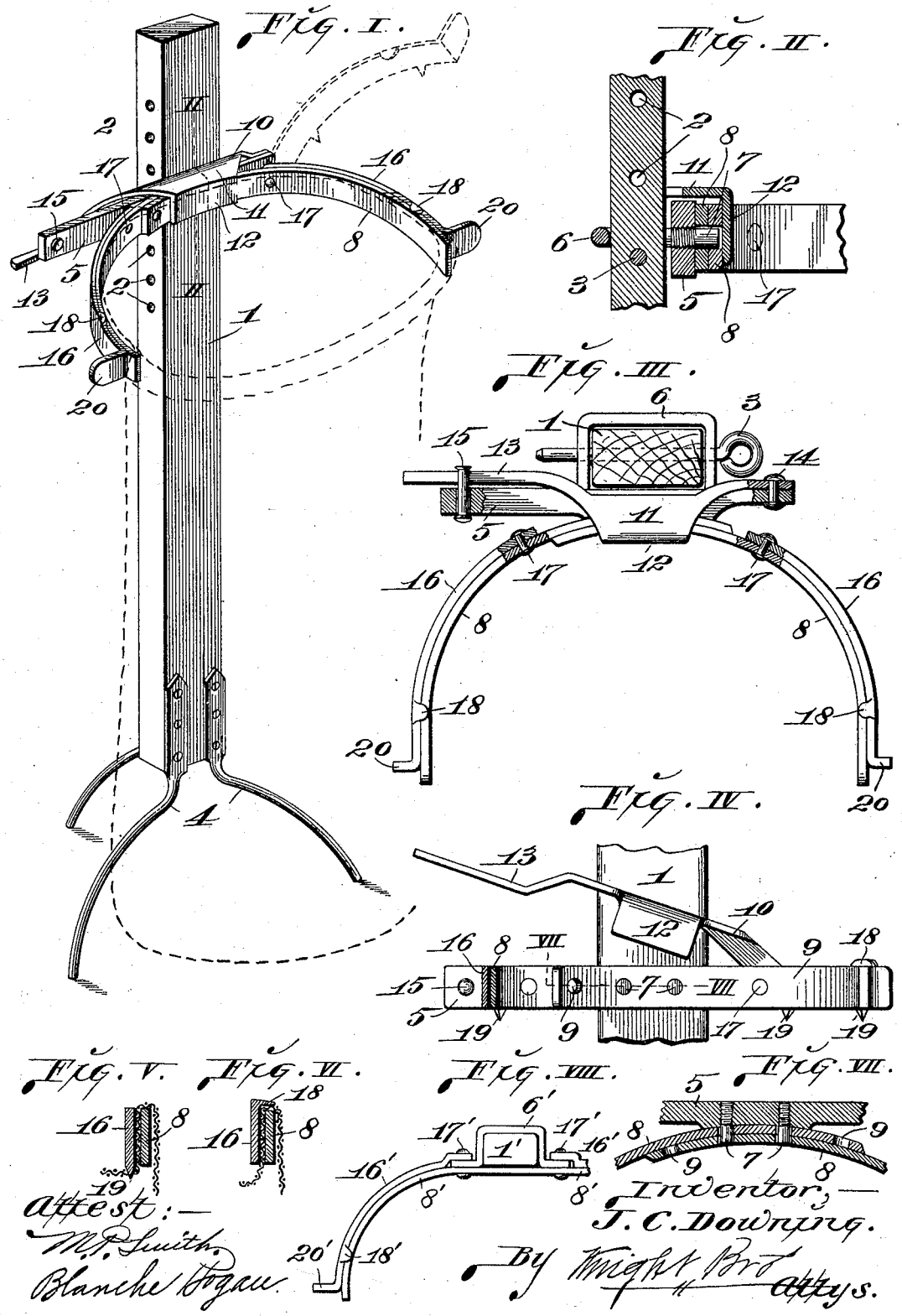

JOSEPH C. DOWNING, OF LOUISIANA, MISSOURI.

BAG-HOLDER.

No. 800,087.      Specification of Letters Patent.      Patented Sept. 19, 1905.

Application filed January 14, 1905. Serial No. 241,152.

*To all whom it may concern:*

Be it known that I, JOSEPH C. DOWNING, a citizen of the United States, residing in Louisiana, in the county of Pike and State of Missouri, have invented certain new and useful Improvements in Bag-Holders, of which the following is a full, clear, and exact description, reference being had to the accompanying drawings, forming part of this specification.

My invention relates to a holder for supporting bags in spread condition while being filled.

Figure I is a perspective view of my bag-holder. Fig. II is an enlarged vertical section taken on line II II, Fig. I. Fig. III is a top or plan view with parts in horizontal section. Fig. IV is a front elevation of the bag-gripping members with parts shown in vertical section and the clamp-bar shown elevated from the bag-gripping members. Fig. V is a cross-section taken through two of the bag-gripping members at the location of one of the prongs projecting from one of said members. Fig. VI is a cross-section of two of the bag-gripping members at the location of one of the stop-lugs projecting from one of the members. Fig. VII is a horizontal section taken on line VII VII, Fig. IV. Fig. VIII is a top view of a modification.

The stand of my bag-holder consists of a post 1, provided with transverse pin-holes 2, that receive a pin 3, and post-supporting legs 4.

5 designates a horizontal bar that is supported by the stand-post 1 through the medium of a yoke 6, that is loosely fitted to the stand-post and rests upon the pin 3, whereby said bar may be upheld at various elevations.

7 designates a pair of studs projecting forwardly from the horizontal bar 5 and spaced apart, as seen in Fig. VII.

8 designates inner bag-gripping arms, these arms being provided at their inner ends with a plurality of apertures 9, preferably three in number, that are adapted to receive the studs 7 for the attachment of the arms to the horizontal bar 5. By providing a plurality of the apertures 9 in said arms the arms may be adjustably fitted to the horizontal bar in a manner to provide for the contraction or expansion of the arms with respect to each other in order that the mouths of small or large bags may be positioned within the arms and the bag edges be stretched over said arms to hold the mouths open.

10 designates a clamp-bar that is provided with a forward extension 11, bearing a downturned lip 12. This clamp-bar is pivotally connected at one end to the horizontal bar 5 at 14 (see Fig. III) and at its opposite end is provided with a handle 13. The clamp-bar is adapted to swing vertically on its pivot, and the lip 12 of said bar is spaced apart from the body of the bar sufficiently to permit of its passage in a vertical direction in front of the inner arms 8 in order that said lip will engage the inner ends of the arms and confine them to the studs 7, to which they are fitted, and also so that when the clamp-bar is raised the lip 12 will move out of engagement with the inner arms to permit of their being adjusted on the studs 7. The handle 13 of the clamp-bar is arranged to pass into a position at the rear of the horizontal bar 5 when the clamping-bar is moved into clamping engagement with the inner arms 8. When in this position, the clamp-bar is held from movement by a keeper-pin 15, that passes loosely through the horizontal bar 5 and is adapted to be shifted over the clamp-bar arm, as seen in Fig. III.

16 designates outer gripping-arms pivoted at 17 to the inner gripping-arms 8 and corresponding in contour to said inner arms. The outer gripping-arms are provided with stop-lugs 18, projecting inwardly therefrom and adapted to engage the upper edges of the inner gripping-arms to limit the downward movement of the outer arms. Extending downwardly from the lower edges of the outer gripping-arms are spurs 19. (See Figs. IV and V and dotted lines, Fig. I.) Each outer gripping-arm terminates in an outturned finger-hold 20.

When the inner gripping-arms, which, as stated, carry the outer gripping-arms, are properly adjusted according to the size of the bag to be supported by my holder, the bag is applied to the holder in the following manner: One of the outer gripping-arms is first elevated into the position seen in dotted lines, Fig. I, and a portion of the mouth edge of the bag is passed over the inner gripping-arm and downwardly at the outer side thereof, after which the previously-elevated outer gripping-arm is swung downwardly to confine the outstretched edge of the bag between the inner and outer gripping-arms, the spurs 19, projecting from the outer arms, passing through the mesh of the bag and preventing slippage thereof in addition to the gripping action between the arms. The same procedure is then carried out with respect to the gripping-arms at the other side of the holder, and when this has been accomplished the bag is held in open-mouthed condition and supported for convenient filling.

In Fig. VIII, I have shown a modification wherein the inner gripping-arms 8' are in the form of an integral member and are removably fitted to the stand-post 1 through the medium of a yoke 6'. In this construction the outer gripping-arms 16' are pivoted to the inner arms at 17' and are of the same form as those previously described, whereby they act in conjunction with the inner arms to grip the bag, as in the first-described construction.

I claim as my invention—

1. In a bag-holder, the combination of a support, inner gripping-arms adapted to be upheld by said support, and outer gripping-arms swingingly connected to said inner arms; said outer gripping-arms being provided with spurs and stop-lugs, substantially as and for the purpose set forth.

2. In a bag-holder, the combination of a support, an arm-receiving member, inner gripping-arms adjustably fitted to said arm-receiving member, and a pair of outer gripping-arms swingingly connected to said inner arms independent of each other and arranged to be swung downwardly into horizontal alinement with said inner arms; said outer gripping-arms being provided with spurs, substantially as and for the purpose set forth.

3. In a bag-holder, the combination of a support, an arm-receiving member, inner gripping-arms adjustably fitted to said arm-receiving member, and a pair of outer gripping-arms swingingly connected to said inner arms independent of each other and arranged to be swung downwardly into horizontal alinement with said inner arms; said outer gripping-arms being provided with spurs and stop-lugs, substantially as and for the purpose set forth.

4. In a bag-holder, the combination of a support, an arm-receiving member, inner gripping-arms adjustably fitted to said arm-receiving member, clamping means carried by said arm-receiving member for engagement with said inner arms, and a pair of outer gripping-arms movably secured to said inner gripping-arms independent of each other and arranged to be swung downwardly into horizontal alinement with said inner arms, substantially as set forth.

5. In a bag-holder, the combination of a supporting member, an arm-receiving member, inner gripping-arms adjustably fitted to said arm-receiving member, a clamp-bar swingingly connected to said arm-receiving member to engage with said inner arm, means for holding said clamp-bar in engagement with said arms, and outer gripping-arms movably secured to said inner arms, substantially as set forth.

6. In a bag-holder, the combination of a supporting member, an arm-receiving member, inner arms adjustably fitted to said arm-receiving member, a clamping-bar swingingly connected to said arm-receiving member, a keeper-pin shiftably supported in said arm-supporting member and arranged for engagement with said clamping-bar, and outer gripping-arms movably connected to said inner arms, substantially as set forth.

7. In a bag-holder, the combination of a supporting member, an arm-receiving member, studs projecting from said arm-receiving member, apertured inner gripping-arms fitted to said studs, a clamping-bar pivoted to said arm-receiving member and arranged for engagement with said inner arms, and outer gripping-arms movably connected to said inner arms, substantially as set forth.

JOSEPH C. DOWNING.

In presence of—
NELLIE V. ALEXANDER,
E. S. KNIGHT.